United States Patent
Gao et al.

(10) Patent No.: US 11,061,116 B2
(45) Date of Patent: Jul. 13, 2021

(54) LIDAR SYSTEM WITH IMAGE SIZE COMPENSATION MECHANISM

(71) Applicant: Nuro, Inc., Mountain View, CA (US)

(72) Inventors: Lu Gao, Cupertino, CA (US); Wenjian Cai, Pleasanton, CA (US)

(73) Assignee: Nuro, Inc., Mountain View, CA (US)

( * ) Notice: Subject to any disclaimer, the term of this patent is extended or adjusted under 35 U.S.C. 154(b) by 475 days.

(21) Appl. No.: 16/030,662

(22) Filed: Jul. 9, 2018

(65) Prior Publication Data

US 2019/0018109 A1    Jan. 17, 2019

Related U.S. Application Data

(60) Provisional application No. 62/532,282, filed on Jul. 13, 2017.

(51) Int. Cl.
*G01S 7/481*    (2006.01)
*G01S 17/89*    (2020.01)
*G01S 17/931*    (2020.01)

(52) U.S. Cl.
CPC ............ *G01S 7/4811* (2013.01); *G01S 7/4815* (2013.01); *G01S 17/89* (2013.01); *G01S 17/931* (2020.01)

(58) Field of Classification Search
CPC ...... G01S 7/4811; G01S 7/4815; G01S 17/89; G01S 17/931
USPC ........................................................ 356/4.01
See application file for complete search history.

(56) References Cited

U.S. PATENT DOCUMENTS

| | | |
|---|---|---|
| 3,064,252 A | 11/1962 | Varela |
| 4,952,911 A | 8/1990 | D'Ambrosia et al. |
| 5,877,688 A | 3/1999 | Morinaka et al. |
| D411,814 S | 7/1999 | Chibuka et al. |
| 6,034,803 A | 3/2000 | Sullivan et al. |
| 6,323,941 B1 | 11/2001 | Evans et al. |
| 7,030,968 B2 | 4/2006 | D'Aligny et al. |
| 7,064,817 B1* | 6/2006 | Schmitt ............... G01S 7/4972 356/139.01 |
| 7,190,465 B2 | 3/2007 | Froehlich et al. |
| 7,227,116 B2 | 6/2007 | Glecker |
| 7,281,891 B2 | 10/2007 | Smith et al. |
| 7,534,984 B2 | 5/2009 | Gleckler |
| D615,905 S | 5/2010 | Arnell |
| 7,944,548 B2 | 5/2011 | Eaton |

(Continued)

FOREIGN PATENT DOCUMENTS

| | | |
|---|---|---|
| JP | H036407 A | 1/1991 |
| JP | 2001256576 A | 9/2001 |
| JP | 2006177843 A | 7/2006 |

OTHER PUBLICATIONS

"Field of view," Wikipedia, 2021, downloaded from https://en.wikipedia.org/wiki/Field_of_view Apr. 28, 2021, 5 pages (Year: 2021).*

(Continued)

*Primary Examiner* — Daniel L Murphy

(57) ABSTRACT

Described are LiDAR systems including an apparatus configured to translate one or more spherical lenses, an array of light sources, an array of photodetectors, or any combination thereof of a collection optical system in the Z direction (optical axis) to move the image plane of the collection optical system and match the image size between a transmission optical system and the collection optical system.

13 Claims, 3 Drawing Sheets

(56) References Cited

U.S. PATENT DOCUMENTS

| | | | |
|---|---|---|---|
| 8,072,581 B1 | 12/2011 | Breiholz | |
| 8,675,184 B2 | 3/2014 | Schmitt et al. | |
| 8,717,492 B2* | 5/2014 | McMackin | H04N 5/2351 348/349 |
| 8,836,922 B1 | 9/2014 | Pennecot et al. | |
| D734,211 S | 7/2015 | Ahn et al. | |
| 9,086,273 B1 | 7/2015 | Gruver et al. | |
| D755,673 S | 5/2016 | Ahn et al. | |
| 2018/0180722 A1* | 6/2018 | Pei | G01S 17/42 |

OTHER PUBLICATIONS

"Field of regard" Wikipedia, 2021, downloaded from https://en.wikipedia.org/wiki/Field_of_regard Apr. 29, 2021, 1 page. (Year: 2021).*

American National Standard for Safe Use of Lasers. ANSI ZI136.1-2000 (§4.5.1.5; 4.5.1.3-4 and p. 5) (19 pgs) (2000).

AN/TPS-43 Radar System Westinghouse. Westinghouse (pp. 3, 4, 6, 9 & 14) (14 pgs) (2007).

Chen et al. 3d object proposals for accurate object class detection. In Advances in Neural Information Processing Systems, pp. 424-432 (2015).

Chen et al. Monocular 3d object detection for autonomous driving. In Proceedings of the IEEE Conference on Computer Vision and Pattern Recognition, pp. 2147-2156 (2016).

Chen et al. Multi-view 3d object detection network for autonomous driving. In IEEE CVPR, pp. 1907-1915 (2017).

Co-pending U.S. Appl. No. 16/030,648, filed Jul. 9, 2018.

Deng et al. Amodal detection of 3d objects: Inferring 3d bounding boxes from 2d ones in rgb-depth images. In Conference on Computer Vision and Pattern Recognition (CVPR), Inspec Accession No. 17355643 (2017).

Engelcke et al. Vote3deep: Fast object detection in 3d point clouds using efficient convolutional neural networks. In Robotics and Automation (ICRA), 2017 IEEE International Conference on, pp. 1355-1361 (2017).

Food and Drugs Rule—Performance Standards for Light-Emitting Products 21 C.F.R. § 1040.10 (19 pgs) (2005).

Fox. vol. 6: Active Electro-Optical Systems. The Infrared & Electro-Optical Systems Handbook. (326 pgs) (1993).

Geiger et al. Vision meets robotics: The KITTI dataset. The International Journal of Robotics Research 32(11):1231-1237 (2013).

Girshick et al. Rich feature hierarchies for accurate object detection and semantic segmentation. In Computer Vision and Pattern Recognition (CVPR) 2014 IEEE Conference on, pp. 580-587 (2014).

Kawata et al. Development of ultra-small lightweight optical range sensor systems. 2005 IEEE/RSJ International Conference on Intelligent Robots and Systems. INSPEC Accession No. 8750287. (6 pgs) (Aug. 2-6, 2005).

Kilpela. Precise pulsed time-of-flight laser range finder for industrial distance measurements. Review of Scientific Instruments 72:2197 (Apr. 2001).

Lahoud et al. 2d-driven 3d object detection in rgb-d images. In Proceedings of the IEEE Conference on Computer Vision and Pattern Recognition, pp. 4622-4630 (2017).

Liu et al. SSD: Single shot multibox detector. In European conference on computer vision, pp. 21-37. Springer (2016).

Maturana et al. Voxnet: a 3d convolutional neural network for real-time object recognition. In IEEE/RSJ International Conference on Intelligent Robots and Systems (7 pgs) (Sep. 2015).

Mousavian et al. 3d bounding box estimation using deep learning and geometry. In Computer Vision and Pattern Recognition (CVPR), pp. 7074-7082 (2016).

Qi et al. Pointnet++: Deep hierarchical feature learning on point sets in a metric space. NIPS (14 pgs) (2017).

Qi et al. Frustum PointNets for 3D Object Detection from RGB-D Data. In Computer Vision and Pattern Recognition (CVPR), pp. 918-927 (Apr. 2018).

Qi et al. Pointnet: Deep learning on point sets for 3d classification and segmentation. Proc. Computer Vision and Pattern Recognition (CVPR), pp. 652-660 (2017).

Qi et al. Volumetric and multi-view cnns for object classification on 3d data. In Proceedings Computer Vision and Pattern Recognition (CVPR), pp. 5648-5656 (2016).

Ren et al. Accurate single stage detector using recurrent rolling convolution. In Computer Vision and Pattern Recognition (CVPR), pp. 5420-5428 (2017).

Ren et al. Faster r-cnn: Towards real-time object detection with region proposal networks. In Advances in neural information processing systems, pp. 91-99 (2015).

Ren et al. Three-dimensional object detection and layout prediction using clouds of oriented gradients. In Proceedings of the IEEE Conference on Computer Vision and Pattern Recognition, pp. 1525-1533 (2016).

Richmond et al. Polarimetric Imaging Laser Radar (PILAR) Program. In Advanced Sensory Payloads for UAV. Meeting Proceedings RTO-MP-SET-092, Paper 19. Neuilly-sur-Sein, France: RTO (35 pgs) (May 1, 2005).

Riegler et al. Octnet: Learning deep 3d representations at high resolutions. In Computer Vision and Pattern Recognition (CVPR), pp. 3577-3586 (2016).

Skolnik. Introduction to Radar Systems Handbook. McGraw-Hill Book Company. (590 pgs)(2d ed. 1980).

Skolnik. Radar Handbook. McGraw-Hill Book Company (1.18, 20.6 & 20.7-8) (846 pgs)(2d ed. 1990).

Song et al. Deep sliding shapes for amodal 3d object detection in rgb-d images. In Proceedings of the IEEE Conference on Computer Vision and Pattern Recognition, pp. 808-816 (2016).

Song et al. Sliding shapes for 3d object detection in depth images. In Computer Vision-ECCV 2014, pp. 634-651 (2014).

Song et al. Sun rgb-d: A rgb-d scene understanding benchmark suite. In Proceedings of the IEEE Conference on Computer Vision and Pattern Recognition, pp. 567-576 (2015).

Su et al. Multi-view convolutional neural networks for 3d shape recognition. In Proceedings of the IEEE Conference on Computer Vision and Pattern Recognition, pp. 945-953 (2015).

Wang et al. O-cnn: Octree-based convolutional neural networks for 3d shape analysis. ACM Transactions on Graphics (TOG) 36(4):72 (2017).

Wu et al. 3d shapenets: A deep representation for volumetric shapes. In Proceedings of the IEEE Conference on Computer Vision and Pattern Recognition, pp. 1912-1920 (2015).

Xiang et al. Data-driven 3d voxel patterns for object category recognition. In Proceedings of the IEEE Conference on Computer Vision and Pattern Recognition, pp. 1903-1911 (2015).

Yu et al. Vehicle detection and localization on birds eye view elevation images using convolutional neural network. 2017 IEEE International Symposium on Safety, Security and Rescue Robotics (SSRR) Inspec Accession No. 17315970 (2017).

Qi et al. Frustum PointNets for 3D Object Detection from RGB-D Data. Available from https://arxiv.org/pdf/1711.08488v1.pdf (15 pgs.) (Nov. 2017).

Gustavson, Robert et al., "Diode laser radar for low-cost weapon guidance," Proc. SPIE 1633, Laser Radar VII: Advanced Technology for Applications, OE/LASE '92, Los Angeles, CA, pp. 21-32 (1992).

* cited by examiner

LIDAR SYSTEM WITH IMAGE SIZE COMPENSATION MECHANISM

CROSS-REFERENCE

This application claims the benefit of U.S. Provisional Application No. 62/532,282, filed Jul. 13, 2017, which application is incorporated herein by reference.

BACKGROUND OF THE INVENTION

A LiDAR is a surveying technology that uses the time-of-flight (TOF) of light transmitted from the LiDAR and reflected/scattered back by objects in the environment to calculate its relative distance to those surrounding objects. It has wide applications from aerial scanning to territorial 3D mapping for autonomous vehicles. 3D maps are created by registering 2D optical images with 3D distance data points. Hence, to build precise and accurate 3D mapping, it is critical to have clear and non-distorted 2D optical images.

SUMMARY OF THE INVENTION

A LiDAR system typically comprises individual light sources, each paired with a photodetector, such that light originated from a light source is collected by a paired photodetector after reflection or scattering off an object in the environment. In such systems, a transmission optical system is used to collimate the laser beams and direct the collimated laser beams to the desired angles and a collection optical system is used to collect the scattered light rays to paired photodetectors. A transmission lens and a collection lens are required to share the same optical performance including the image size at each field position in order to match laser diodes and photodetectors positioned on respective printed circuit boards (PCBs).

However, due to the slight differences that inevitably arise during the manufacturing process and the manufacturing tolerances in quality control, the lenses used in the transmission and collection pathways of a LiDAR often have different optical performances. For example, the two as-built optical assemblies in the transmission pathway and the collection pathway can have different focal lengths and distortions even though their nominal design is the same, resulting in an image size mismatch between the two paths which can distort 2D optical images. Existing LiDAR technology attempts to remedy this problem by adding individual adjustments to each laser diode and photodetector after optical assembly. But such adjustments increase manufacturing complexity and cost, and make future fine-tuning difficult.

One way to match the image size between transmission and receiving optics to eliminate the requirement for individual element alignment is to share the lens for both the transmission and the collection pathway. This requires certain beam splitting/combining optics to partially overlay transmission and receiving path, which results in reduced transmission and/or receiving efficiency and potential ghost light reflected from the shared lens. The LiDAR system configurations described herein avoid such disadvantages.

Described herein are methods of matching the image size and other optical performance characteristics between transmission optics and collection optics for a LiDAR system. The subject matter described herein avoids the image mismatch by allowing a positional adjustment of an optical system to compensate for the mismatch of optics between the two pathways in the LiDAR manufacturing process. Such adjustments would allow for a flexible optical system and remedy gradual deterioration of the optical system due to subtle changes in the positions of components over time.

In one configuration described herein, mismatch is compensated for by moving one or more of the lens elements in the lens assembly of one path to change the focal length of that path so that the image size of that path is matched with the other path. Accordingly, in one aspect, disclosed herein are dual aperture LiDAR systems comprising: at least one array of laser light sources; a transmission optical system; a collection optical system; and at least one array of photodetectors comprising one photodetector paired with each laser light source in the at least one array of laser light sources; the transmission optical system comprising: a rod lens associated with each array of laser light sources and configured to partially collimate light from the light sources in the X direction; and a plurality of spherical lenses configured to further collimate light from the light sources in the X direction, collimate light from the light sources in the Y direction, and provide a field of view in the Y direction when the light is transmitted to an environment external to the LiDAR system; the collection optical system comprising: a plurality of spherical lenses configured to focus the light from the light sources reflected from the environment external to the LiDAR system onto the at least one array of photodetectors; and an apparatus configured to translate one or more of the spherical lenses in the Z direction to change the focal length of the collection optical system and match the image size between the transmission optical system and the collection optical system. In some embodiments, the apparatus configured to translate the one or more spherical lenses comprises a servo, a screw drive, a pin slot mechanism, a translation stage, a linearized motor, or a combination thereof. In some embodiments, the apparatus translates the one or more spherical lenses by about 1 micron to about 5000 microns. In some embodiments, the LiDAR system comprises one array of laser light sources. In some embodiments, the LiDAR system comprises more than one linear array of laser light sources. In further embodiments, the linear array of laser light sources comprises about 2 to about 200 laser light sources. In some embodiments, the LiDAR system comprises about 2 to about 100 linear arrays of laser light sources forming a 2D array of laser light sources. In further embodiments, the 2D array of laser light sources comprises about 4 to about 2000 laser light sources. In some embodiments, each linear array of laser light sources comprises a single, planar printed circuit board. In some embodiments, the transmission optical system comprises about 2 to about 10 spherical lenses. In some embodiments, the collection optical system comprises about 2 to about 10 spherical lenses. In some embodiments, the field of view in the Y direction is about 3 degrees to about 30 degrees. In other embodiments, the field of view in the Y direction is about 25 degrees to about 60 degrees. In some embodiments, each array of photodetectors comprises a single, planar printed circuit board. In some embodiments, the at least one array of laser light sources, the transmission optical system, the collection optical system, and the at least one array of photodetectors are configured to rotate to create a field of view in the azimuth direction. In further embodiments, the field of view in the azimuth direction is 360 degrees. In some embodiments, the LiDAR system further comprises an enclosure. In further embodiments, the at least one array of laser light sources, the transmission optical system, the collection optical system, and the at least one array of photodetectors are configured to rotate within the enclosure to create the field of view in the azimuth direction. In still further embodiments, the enclosure allows passage of light from the transmission optical system and allows passage of light to the collection optical system. In some embodiments, the enclosure is a cylindrical pipe enclosure. In further embodiments, the transmission optical system further comprises a cylindrical lens configured to compensate the optical power introduced by the cylindrical pipe enclosure in the X direction. In some embodiments, the LiDAR system further comprises an opaque baffle between the transmission optical system and the collection optical system. In further embodiments, the opaque baffle prevents light from the transmission optical system, which is not reflected from the environment external to the LiDAR system, from entering the collection optical system.

In another aspect, disclosed herein are LiDAR systems comprising: at least one array of laser light sources; a transmission optical system comprising a plurality of spherical lenses; a collection optical system comprising a plurality of spherical lenses; at least one array of photodetectors comprising one photodetector paired with each laser light source in the at least one linear array of laser light sources; the collection optical system further comprising an apparatus configured to translate one or more of the spherical lenses of collection optical system to change the focal length of the collection optical system and match an image size between the transmission optical system and the collection optical system. In some embodiments, the apparatus configured to translate the one or more spherical lenses comprises a servo, a screw drive, a pin slot mechanism, a translation stage, or a linearized motor. In some embodiments, the apparatus translates the one or more spherical lenses by 1 micron to 5000 microns. In some embodiments, the LiDAR system comprises one array of laser light sources. In further embodiments, the array of laser light sources comprises 2 to 200 laser light sources. In some embodiments, the at least one array of laser light sources is linear. In further embodiments, the LiDAR system comprises 2 to 100 linear arrays of laser light sources forming a 2D array of laser light sources. In still further embodiments, the 2D array of laser light sources comprises 4 to 2000 laser light sources. In a particular embodiment, each linear array of laser light sources comprises a single, planar printed circuit board. In some embodiments, the transmission optical system comprises 2 to 10 spherical lenses. In some embodiments, the collection optical system comprises 2 to 10 spherical lenses. In a particular embodiment, each array of photodetectors comprises a single, planar printed circuit board. In some embodiments, the at least one array of laser light sources, the transmission optical system, the collection optical system, and the at least one array of photodetectors are configured to rotate to create a field of view in the azimuth direction. In further embodiments, the field of view in the azimuth direction is 360 degrees. In some embodiments, the LiDAR system further comprises an enclosure. In further embodiments, the at least one linear array of laser light sources, the transmission optical system, the collection optical system, and the at least one array of photodetectors are configured to rotate within the enclosure to create the field of view in the azimuth direction. In some embodiments, the enclosure allows passage of light from the transmission optical system and allows passage of light to the collection optical system. In a particular embodiment, the enclosure is a cylindrical pipe enclosure. In further embodiments, the transmission optical system further comprises a cylindrical lens configured to compensate the optical power introduced by the cylindrical pipe enclosure in the X direction. In some embodiments, the LiDAR system further comprises a baffle between the transmission optical system and the collection optical system. In further embodiments, the baffle is opaque. In still further embodiments, the opaque baffle prevents light from the transmission optical system, which is not reflected from the environment external to the LiDAR system, from entering the collection optical system. In still further embodiments, the baffle is opaque to light with wavelength in visible spectrum or longer.

Further, in a related aspect, disclosed herein are dual aperture LiDAR systems comprising: at least one array of laser light sources; a transmission optical system; a collection optical system; and at least one array of photodetectors comprising one photodetector paired with each laser light source in the at least one linear array of laser light sources; the transmission optical system comprising: a rod lens associated with each array of laser light sources and configured to partially collimate light from the light sources in the X direction; and a plurality of spherical lenses wherein at least some of the plurality of spherical lenses are configured to further collimate light from the light sources in the X direction, collimate light from the light sources in the Y direction, and provide a field of view in the Y direction when the light is transmitted to an environment external to the LiDAR system; and an apparatus configured to translate one or more of the spherical lenses in the Z direction to change the focal length of the transmission optical system and match the image size between the transmission optical system and the collection optical system; the collection optical system comprising: a plurality of spherical lenses wherein at least some of the plurality of spherical lenses are configured to focus the light from the light sources reflected from the environment external to the LiDAR system onto the at least one array of photodetectors. In some embodiments, the apparatus configured to translate the one or more spherical lenses comprises a servo, a screw drive, a pin slot mechanism, a translation stage, a linearized motor, or a combination thereof. In some embodiments, the apparatus translates the one or more spherical lenses by about 1 micron to about 5000 microns. In some embodiments, the LiDAR system comprises one array of laser light sources. In some embodiments, the LiDAR system comprises more than one linear array of laser light sources. In further embodiments, the linear array of laser light sources comprises about 2 to about 200 laser light sources. In some embodiments, the LiDAR system comprises about 2 to about 100 linear arrays of laser light sources forming a 2D array of laser light sources. In further embodiments, the 2D array of laser light sources comprises about 4 to about 2000 laser light sources. In some embodiments, each linear array of laser light sources comprises a single, planar printed circuit board. In some embodiments, the transmission optical system comprises about 2 to about 10 spherical lenses. In some embodiments, the collection optical system comprises about 2 to about 10 spherical lenses. In some embodiments, the field of view in the Y direction is about 3 degrees to about 30 degrees. In other embodiments, the field of view in the Y direction is about 25 degrees to about 60 degrees. In some embodiments, each array of photodetectors comprises a single, planar printed circuit board. In some embodiments, the at least one array of laser light sources, the transmission optical system, the collection optical system, and the at least one array of photodetectors are configured to rotate to create a field of view in the azimuth direction. In further embodiments, the field of view in the azimuth direction is 360 degrees. In some embodiments, the LiDAR system further comprises an enclosure. In further embodiments, the at least one array of laser light sources, the transmission optical system, the collection optical system, and the at least one array of photodetectors are configured to rotate within the enclosure to create the field of view in the azimuth direction. In still further embodiments, the enclosure allows passage of light from the transmission optical system and allows passage of light to the collection optical system. In some embodiments, the enclosure is a cylindrical pipe enclosure. In further embodiments, the transmission optical system further comprises a cylindrical lens configured to compensate the optical power introduced by the cylindrical pipe enclosure in the X direction. In some embodiments, the LiDAR system further comprises an opaque baffle between the transmission optical system and the collection optical system. In further embodiments, the opaque baffle prevents light from the transmission optical system, which is not reflected from the environment external to the LiDAR system, from entering the collection optical system.

In another aspect, disclosed herein are LiDAR systems comprising: at least one array of laser light sources; a transmission optical system comprising a plurality of spherical lenses; a collection optical system comprising a plurality of spherical lenses; at least one array of photodetectors comprising one photodetector paired with each laser light source in the at least one linear array of laser light sources; the transmission optical system further comprising an apparatus configured to translate one or more of the spherical lenses of transmission optical system to change the focal length of the transmission optical system and match an image size between the collection optical system and the transmission optical system. In some embodiments, the apparatus configured to translate the one or more spherical lenses comprises a servo, a screw drive, a pin slot mechanism, a translation stage, or a linearized motor. In some embodiments, the apparatus translates the one or more spherical lenses by 1 micron to 5000 microns. In some embodiments, the LiDAR system comprises one array of laser light sources. In further embodiments, the array of laser light sources comprises 2 to 200 laser light sources. In some embodiments, the at least one array of laser light sources is linear. In further embodiments, the LiDAR system comprises 2 to 100 linear arrays of laser light sources forming a 2D array of laser light sources. In still further embodiments, the 2D array of laser light sources comprises 4 to 2000 laser light sources. In a particular embodiment, each linear array of laser light sources comprises a single, planar printed circuit board. In some embodiments, the transmission optical system comprises 2 to 10 spherical lenses. In some embodiments, the collection optical system comprises 2 to 10 spherical lenses. In a particular embodiment, each array of photodetectors comprises a single, planar printed circuit board. In some embodiments, the at least one array of laser light sources, the transmission optical system, the collection optical system, and the at least one array of photodetectors are configured to rotate to create a field of view in the azimuth direction. In further embodiments, the field of view in the azimuth direction is 360 degrees. In some embodiments, the LiDAR system further comprises an enclosure. In further embodiments, the at least one linear array of laser light sources, the transmission optical system, the collection optical system, and the at least one array of photodetectors are configured to rotate within the enclosure to create the field of view in the azimuth direction. In some embodiments, the enclosure allows passage of light from the transmission optical system and allows passage of light to the collection optical system. In a particular embodiment, the enclosure is a cylindrical pipe enclosure. In further embodiments, the transmission optical system further comprises a cylindrical lens configured to compensate the optical power introduced by the cylindrical pipe enclosure in the X direction. In some embodiments, the LiDAR system further comprises a baffle between the transmission optical system and the collection optical system. In further embodiments, the baffle is opaque. In still further embodiments, the opaque baffle prevents light from the transmission optical system, which is not reflected from the environment external to the LiDAR system, from entering the collection optical system. In still further embodiments, the baffle is opaque to light with wavelength in visible spectrum or longer.

In another configuration described herein, the image size between the transmission and collection pathways is matched by moving the image plane. As the image plane moves, the position of the off-axis field is moving along the image plane resulting in an image size change. A side effect is increased image blur due to defocusing from the image plane movement. However, this effect can help compensate the image mismatch caused by the focal length or distortion change in as-built lenses. Accordingly, in another aspect, disclosed herein are dual aperture LiDAR systems comprising: at least one array of laser light sources; a transmission optical system; a collection optical system; and at least one array of photodetectors comprising one photodetector paired with each laser light source in the at least one array of laser light sources; the transmission optical system comprising: a rod lens associated with each array of laser light sources and configured to partially collimate light from the light sources in the X direction; and a plurality of spherical lenses configured to further collimate light from the light sources in the X direction, collimate light from the light sources in the Y direction, and provide a field of view in the Y direction when the light is transmitted to an environment external to the LiDAR system; the collection optical system comprising: a plurality of spherical lenses configured to focus the light from the light sources reflected from the environment external to the LiDAR system onto the at least one array of photodetectors; the LiDAR system further comprising an apparatus configured to translate the array of laser light sources in the Z direction to move the image plane of the transmission optical system or translate the at least one array of photodetectors in the Z direction to move the image plane of the collection optical system and compensate the image size mismatch between the transmission optical system and the collection optical system. In some embodiments, the apparatus configured to translate the at least one array of laser light sources or the at least one array of photodetectors comprises a servo, a screw drive, a translation stage, a pin slot mechanism, a linearized motor, or a combination thereof. In some embodiments, the apparatus translates the array of laser light sources by about 1 micron to about 5000 microns. In some embodiments, the apparatus translates the at least one array of photodetectors by about 1 micron to about 5000 microns. In some embodiments, the LiDAR system comprises one array of laser light sources. In further embodiments, the linear array of laser light sources comprises about 2 to about 200 laser light sources. In some embodiments, the LiDAR system comprises more than one linear array of laser light sources. In some embodiments, the LiDAR system comprises about 2 to about 100 linear arrays of laser light sources forming a 2D array of laser light sources. In further embodiments, the 2D array of laser light sources comprises about 4 to about 2000 laser light sources. In some embodiments, each linear array of laser light sources comprises a single, planar printed circuit board. In some embodiments, the transmission optical system comprises about 2 to about 10 spherical lenses. In some embodiments, the collection optical system comprises about 2 to about 10 spherical lenses. In some embodiments, the field of view in the Y direction is about 3 degrees to about 30 degrees. In other embodiments, the field of view in the Y direction is about 25 degrees to about 60 degrees. In some embodiments, each array of photodetectors comprises a single, planar printed circuit board. In some embodiments, the at least one array of laser light sources, the transmission optical system, the collection optical system, the at least one array of photodetectors, and the apparatus configured to translate the at least one array of laser light sources or the array of photodetectors are configured to rotate to create a field of view in the azimuth direction. In further embodiments, the field of view in the azimuth direction is 360 degrees. In some embodiments, the LiDAR system further comprises an enclosure. In further embodiments, the at least one array of laser light sources, the transmission optical system, the collection optical system, the at least one array of photodetectors, and the apparatus configured to translate the at least one array of laser light sources or the at least one array of photodetectors are configured to rotate within the enclosure to create the field of view in the azimuth direction. In still further embodiments, the enclosure allows passage of light from the transmission optical system and allows passage of light to the collection optical system. In some embodiments, the enclosure is a cylindrical pipe enclosure. In further embodiments, the transmission optical system further comprises a cylindrical lens configured to compensate the optical power introduced by the cylindrical pipe enclosure in the X direction. In some embodiments, the LiDAR system further comprises an opaque baffle between the transmission optical system and the collection optical system. In further embodiments, the opaque baffle prevents light from the transmission optical system, which is not reflected from the environment external to the LiDAR system, from entering the collection optical system.

In another aspect, disclosed herein are LiDAR systems comprising: at least one array of laser light sources; a transmission optical system comprising a plurality of spherical lenses; a collection optical system comprising a plurality of spherical lenses; at least one array of photodetectors comprising one photodetector paired with each laser light source in the at least one linear array of laser light sources; and an apparatus configured to translate the at least one array of laser light sources to move the image plane of the transmission optical system or translate the at least one array of photodetectors to move the image plane of the collection optical system and match an image size between the transmission optical system and the collection optical system. In some embodiments, the apparatus configured to translate the at least one array of laser light sources in the Z direction to move the image plane of the transmission optical system or translate the at least one array of photodetectors in the Z direction to move the image plane of the collection optical system comprises a servo, a screw drive, a translation stage, a pin slot mechanism, or a linearized motor. In some embodiments, the apparatus translates the at least one array of laser light sources by 1 micron to 5000 microns. In some embodiments, the apparatus translates the at least one array of photodetectors by 1 micron to 5000 microns. In some embodiments, the LiDAR system comprises one array of laser light sources. In further embodiments, the array of laser light sources comprises 2 to 200 laser light sources. In some embodiments, the at least one array of laser light sources is linear. In further embodiments, the LiDAR system comprises 2 to 100 linear arrays of laser light sources forming a 2D array of laser light sources. In further embodiments, the 2D array of laser light sources comprises 4 to 2000 laser light sources. In a particular embodiment, each linear array of laser light sources comprises a single, planar printed circuit board. In some embodiments, the transmission optical system comprises 2 to 10 spherical lenses. In some embodiments, the collection optical system comprises 2 to 10 spherical lenses. In a particular embodiment, each array of photodetectors comprises a single, planar printed circuit board. In some embodiments, the at least one linear array of laser light sources, the transmission optical system, the collection optical system, the at least one array of photodetectors, and the apparatus configured to translate the at least one array of laser light sources or the at least one array of photodetectors are configured to rotate to create a field of view in the azimuth direction. In further embodiments, the field of view in the azimuth direction is 360 degrees. In some embodiments, the LiDAR system further comprises an enclosure. In further embodiments, the at least one array of laser light sources, the transmission optical system, the collection optical system, the at least one array of photodetectors, and the apparatus configured to translate the at least one array of laser light sources or the at least one array of photodetectors are configured to rotate within the enclosure to create the field of view in the azimuth direction. In some embodiments, the enclosure allows passage of light from the transmission optical system and allows passage of light to the collection optical system. In a particular embodiment, the enclosure is a cylindrical pipe enclosure. In further embodiments, the transmission optical system further comprises a cylindrical lens configured to compensate the optical power introduced by the cylindrical pipe enclosure in the X direction. In some embodiments, the LiDAR system further comprises a baffle between the transmission optical system and the collection optical system. In further embodiments, the baffle is opaque. In still further embodiments, the opaque baffle prevents light from the transmission optical system, which is not reflected from the environment external to the LiDAR system, from entering the collection optical system. In still further embodiments, the baffle is opaque to light with wavelength in visible spectrum or longer.

BRIEF DESCRIPTION OF THE DRAWINGS

An understanding of the features and advantages of the described subject matter will be obtained by reference to the following detailed description that sets forth illustrative embodiments and the accompanying drawings of which.

DETAILED DESCRIPTION OF THE INVENTION

Figure 1:
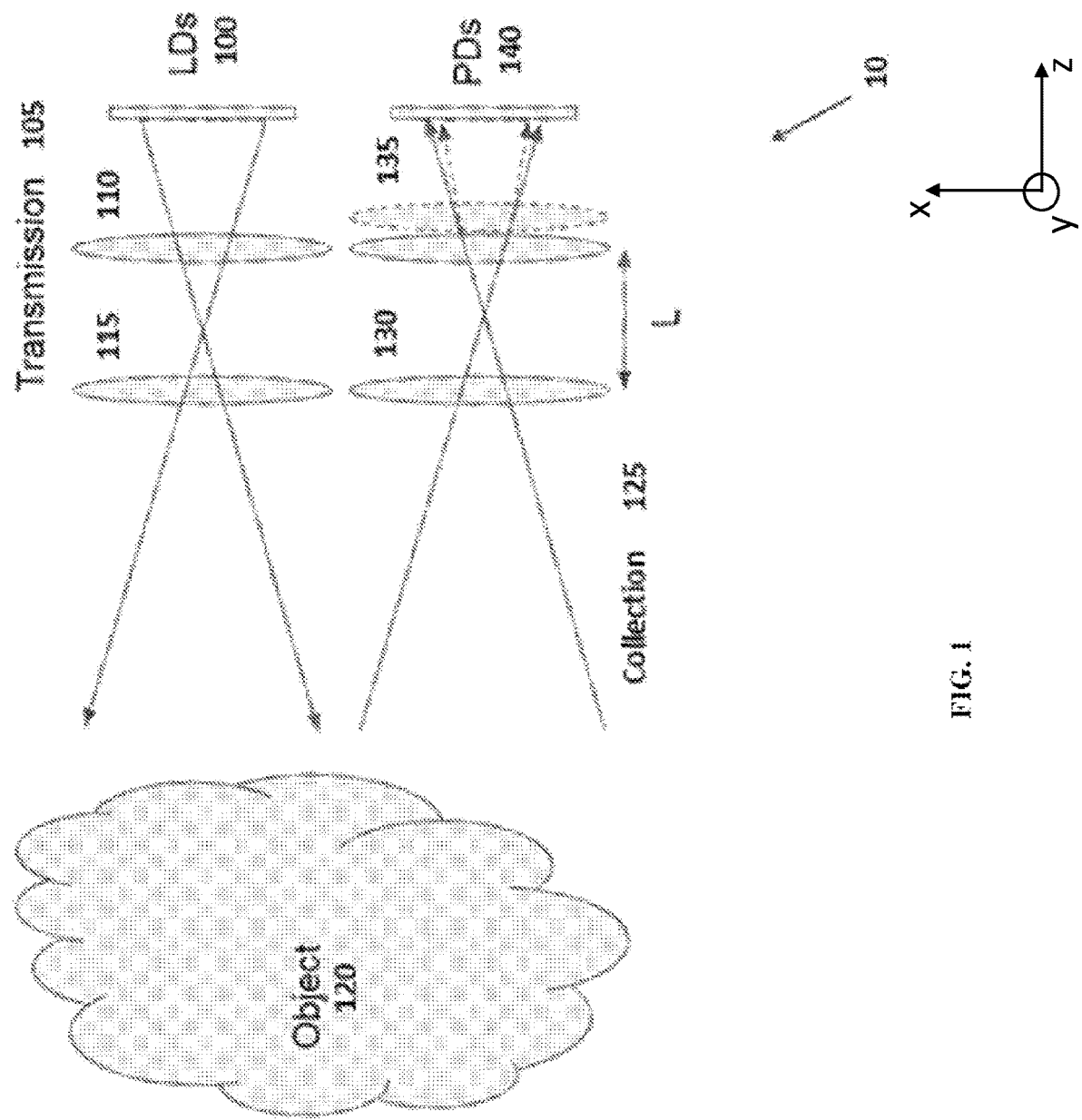
FIG. 1 shows a non-limiting schematic diagram of an optical system comprising a transmission optical system and a collection optical system; in this case, the transmission optical system and the collection optical system each comprise two spherical lenses; and light travels from an array of laser diodes through the spherical lenses in the transmission optical system to an object and when reflected by the object, the light passes through the spherical lenses in collection optical system to reach photodetectors; and one of the spherical lenses in collection optical system is translated along the Z axis to change the focal length of the collection optical pathway so that the image size of the collection optical pathway matches that of the transmission optical pathway.

Described herein, in certain embodiments, are dual aperture LiDAR systems comprising: at least one array of laser light sources; a transmission optical system; a collection optical system; and at least one array of photodetectors comprising one photodetector paired with each laser light source in the at least one array of laser light sources; the transmission optical system comprising: a rod lens associated with each array of laser light sources and configured to partially collimate light from the light sources in the X direction; and a plurality of spherical lenses configured to further collimate light from the light sources in the X direction, collimate light from the light sources in the Y direction, and provide a field of view in the Y direction when the light is transmitted to an environment external to the LiDAR system; the collection optical system comprising: a plurality of spherical lenses configured to focus the light from the light sources reflected from the environment external to the LiDAR system onto the at least one array of photodetectors; and an apparatus configured to translate one or more of the spherical lenses in the Z direction to change the focal length of the collection optical system and match the image size between the transmission optical system and the collection optical system.

Also described herein, in certain embodiments, are LiDAR systems comprising: at least one array of laser light sources; a transmission optical system comprising a plurality of spherical lenses; a collection optical system comprising a plurality of spherical lenses; at least one array of photodetectors comprising one photodetector paired with each laser light source in the at least one linear array of laser light sources; the collection optical system further comprising an apparatus configured to translate one or more of the spherical lenses of collection optical system to change the focal length of the collection optical system and match an image size between the transmission optical system and the collection optical system.

Also described herein, in certain embodiments, are dual aperture LiDAR systems comprising: at least one array of laser light sources; a transmission optical system; a collection optical system; and at least one array of photodetectors comprising one photodetector paired with each laser light source in the at least one linear array of laser light sources; the transmission optical system comprising: a rod lens associated with each array of laser light sources and configured to partially collimate light from the light sources in the X direction; and a plurality of spherical lenses wherein at least some of the plurality of spherical lenses are configured to further collimate light from the light sources in the X direction, collimate light from the light sources in the Y direction, and provide a field of view in the Y direction when the light is transmitted to an environment external to the LiDAR system; and an apparatus configured to translate one or more of the spherical lenses in the Z direction to change the focal length of the transmission optical system and match the image size between the transmission optical system and the collection optical system; the collection optical system comprising: a plurality of spherical lenses wherein at least some of the plurality of spherical lenses are configured to focus the light from the light sources reflected from the environment external to the LiDAR system onto the at least one array of photodetectors.

Also described herein, in certain embodiments, are LiDAR systems comprising: at least one array of laser light sources; a transmission optical system comprising a plurality of spherical lenses; a collection optical system comprising a plurality of spherical lenses; at least one array of photodetectors comprising one photodetector paired with each laser light source in the at least one linear array of laser light sources; the transmission optical system further comprising an apparatus configured to translate one or more of the spherical lenses of transmission optical system to change the focal length of the transmission optical system and match an image size between the collection optical system and the transmission optical system.

Also described herein, in certain embodiments, are dual aperture LiDAR systems comprising: at least one array of laser light sources; a transmission optical system; a collection optical system; and at least one array of photodetectors comprising one photodetector paired with each laser light source in the at least one array of laser light sources; the transmission optical system comprising: a rod lens associated with each array of laser light sources and configured to partially collimate light from the light sources in the X direction; and a plurality of spherical lenses configured to further collimate light from the light sources in the X direction, collimate light from the light sources in the Y direction, and provide a field of view in the Y direction when the light is transmitted to an environment external to the LiDAR system; the collection optical system comprising: a plurality of spherical lenses configured to focus the light from the light sources reflected from the environment external to the LiDAR system onto the at least one array of photodetectors; the LiDAR system further comprising an apparatus configured to translate the at least one array of laser light sources in the Z direction to move the image plane of the transmission optical system or translate the at least one array of photodetectors in the Z direction to move the image plane of the collection optical system and match the image size between the transmission optical system and the collection optical system.

Also described herein, in certain embodiments, are LiDAR systems comprising: at least one array of laser light sources; a transmission optical system comprising a plurality of spherical lenses; a collection optical system comprising a plurality of spherical lenses; at least one array of photodetectors comprising one photodetector paired with each laser light source in the at least one linear array of laser light sources; and an apparatus configured to translate the at least one array of laser light sources to move the image plane of the transmission optical system or translate the at least one array of photodetectors to move the image plane of the collection optical system and match an image size between the transmission optical system and the collection optical system.

Certain Definitions

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

As used herein "Z direction," means the directions along the optical axis.

As used herein "X direction," means the directions in a plane parallel to the transverse plane of photodetectors and perpendicular to Z direction.

As used herein "Y direction," means the directions perpendicular to X direction and perpendicular to Z direction.

As used herein "X cylinder," "X cylinder lens," or "cylindrical lens with power in X direction" means one or more cylinder lenses that collimate or focus light in X direction.

Array of Laser Light Sources

In some embodiments, the platforms, systems, media, and methods described herein include an array of laser light sources, or use of the same. An array of laser light sources emit light which passes through one or more spherical lenses in a transmission collection pathway. The light then illuminates objects in the surrounding environment which reflects or scatters the light. The reflected or scattered light is collected by a collection optical system and passes through spherical lenses in the collection optical system pathway and illuminates photodetectors, which convert light to signal for processing like depth determination and image processing.

In some embodiments, an apparatus is configured to translate an array of laser light sources in the Z direction to match the image size between the transmission optical system and the collection optical system and to focus the image. In some embodiments, the apparatus comprises a ball bearing system, rack and pinion system, crossed roller system, leadscrew system, or any combination thereof. In some embodiments, the apparatus comprises a servo, a screw drive, a pin slot mechanism, a translation stage, a linearized motor, or a combination thereof. In some embodiments, the apparatus comprises an active translational system which allows the array of laser light sources to be translated as needed in real-time during use. In some embodiments, the apparatus comprises a passive translational system to be adjusted and affixed during a manufacturing process. In some embodiments, the apparatus is adjusted manually by an end user. In some embodiments, the apparatus is adjusted automatically by an automated software controller, application, or component.

In some embodiments, an array of laser light source comprises about 2, about 5, about 10, about 20, about 50, about 75, about 100, or more laser light sources, including increments therein. In some embodiments, an array of laser light sources comprises about 4, about 10, about 20, about 50, about 100, about 200, about 500, about 1000, about 2000, or more laser light sources, including increments therein. In some embodiments, an array of laser light sources comprises at least 2, at least 5, at least 10, at least 20, at least 50, at least 75, at least 100, or more laser light sources, including increments therein. In some embodiments, an array of laser light sources comprises at least 4, at least 10, at least 20, at least 50, at least 100, at least 200, at least 500, at least 1000, at least 2000, or more laser light sources, including increments therein.

In some embodiments, an array of laser light source comprises an array of laser diodes. In some embodiments, an array of laser light source comprises a linear array of laser diodes. In some embodiments, a linear array of laser diodes is mounted onto edges of individual planar boards in parallel fashion and the planar boards are arranged parallel to each other as to form 2D array of laser light sources.

In some embodiments, an array of laser light sources comprises a linear array of laser diodes on a single, planar board. In some embodiments, a laser light source comprises a 2D array of laser diodes on a single, planar board.

In some embodiments, an array of laser light source comprises an array of laser diodes. In some embodiments, an array of laser diodes is mounted onto edges of individual boards in parallel fashion and the boards are arranged parallel to each other with the edges not in an alignment as to form 3D array of laser light source.

In some embodiments, an array of laser light source comprises an array of laser diodes on a single, curved board.

In some embodiments, an array of laser light sources comprises pulsed laser diodes. In some embodiments, an array of laser light sources pulses at about 5,000 Hz, about 10,000 Hz, about 20,000 Hz, about 50,000 Hz, about 100,000 Hz, about 250,000 Hz, or more, including increments therein. In some embodiments, an array of laser light s sources pulses at least 5,000 Hz, at least 10,000 Hz, at least 20,000 Hz, at least 50,000 Hz, at least 100,000 Hz, at least 250,000 Hz, or more, including increments therein. In some embodiments, an array of laser light sources emits a light with wavelengths about 200 nm, about 500 nm, about 1000 nm, about 2000 nm, about 5000 nm, about 10,000 nm, about 15,000 nm, or more, including increments therein. In some embodiments, an array of laser light sources emits a light with wavelengths at least 200 nm, at least 500 nm, at least 1000 nm, at least 2000 nm, at least 5000 nm, at least 10,000 nm, at least 15,000 nm, or more, including increments therein.

Referring to FIG. 1, in a particular embodiment, an array of laser light sources comprises an array of laser diodes (LD) 100 that emits light which is transmitted through a spherical lens 110 and another spherical lens 115 in transmission optical system 105 and onto an object 120 in the surrounding environment. The light reflected from the object 120 then passes through a spherical lens 130 and another spherical lens 135 and is focused onto photodetectors (PDs) 130 in collection optical system 125. An apparatus is configured to translate spherical lens 135 in the Z direction to focus an image of the object onto PDs 140.

Figure 2:
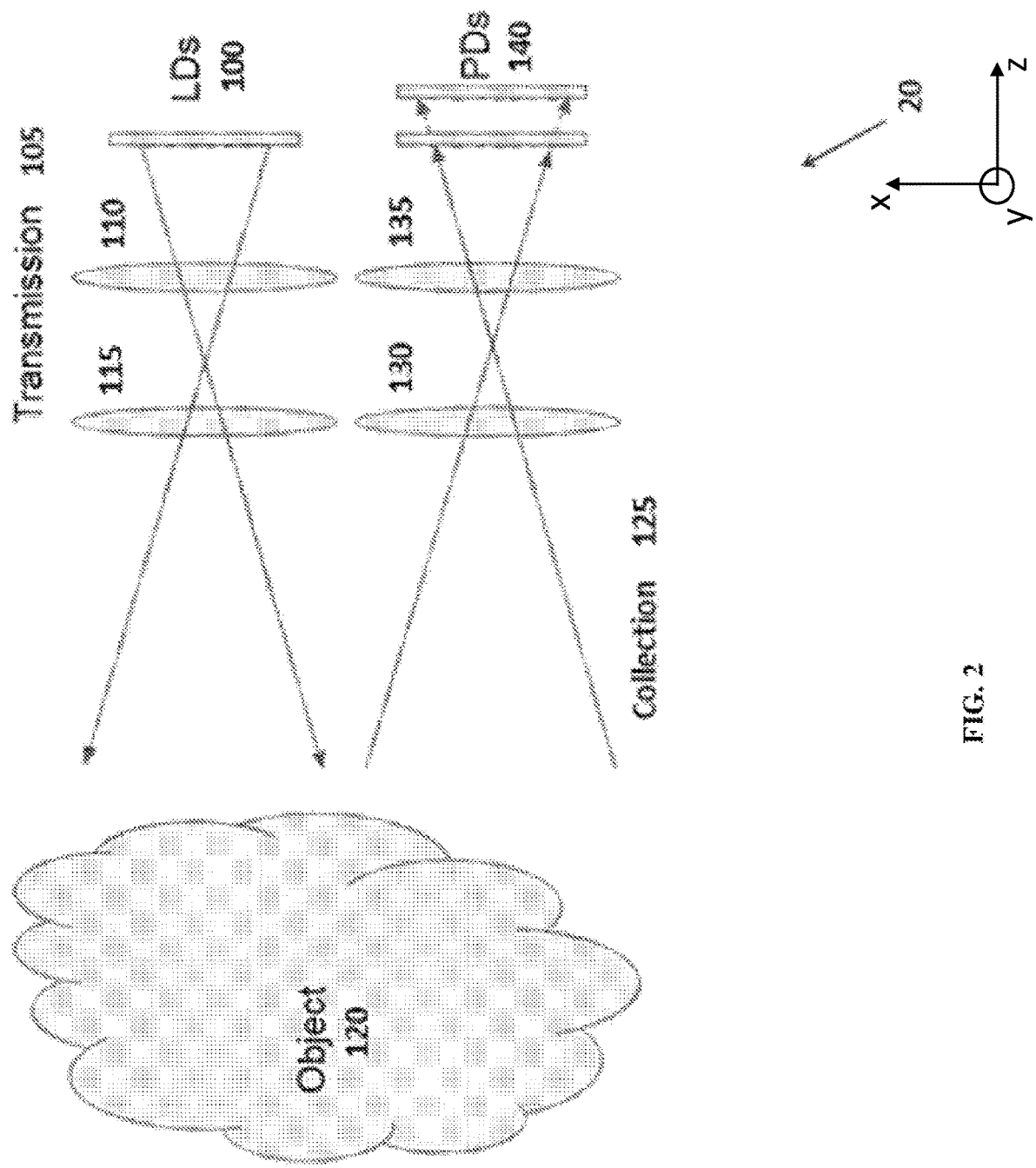
FIG. 2 shows a non-limiting schematic diagram of an optical system comprising a transmission optical system and a collection optical system; in this case, the transmission optical system and the collection optical system each comprise two spherical lenses; and light travels from one or more arrays of laser diodes through the spherical lenses in the transmission optical system to an object and when reflected by the object, the light passes through the spherical lenses in the collection optical system to reach one or more arrays of photodetectors; and the at least one array of photodetectors in the collection optical system is translated along the Z axis to change the focal length of the collection optical pathway so that the image size of the collection optical pathway matches that of the transmission optical pathway.

Referring to FIG. 2, in a particular embodiment, an array of laser light sources comprises an array of laser diodes (LDs) 100 that emits light which is transmitted through a spherical lens 110 and another spherical lens 115 in transmission optical system 105 and onto an object 120 in the surrounding environment. The light reflected from the object 120 then passes through a spherical lens 130 and another spherical lens 135 and is focused onto photodetectors 130 in collection optical system 125. An apparatus is configured to translate photodetectors (PDs) 140 in the Z direction to focus an image of the object onto PDs 140.

Transmission Optical System

In some embodiments, the platforms, systems, media, and methods described herein include a transmission optical system, or use of the same. In some embodiments, the transmission optical system comprises an array of laser diodes and one or more spherical lenses. Transmission optical system emits light from its array of laser diodes, which passes one or more spherical lenses in the transmission optical system pathway. The light illuminates an object in the surroundings and is reflected or scattered by the object. The reflected or scattered light is collected by a collection optical system and an image of the object is focused by spherical lenses in the collection optical system pathway onto photodetectors, which convert light to signal for processing like depth determination and image processing.

Many configurations are suitable for the transmission optical system. In some embodiments, the transmission optical system comprises one spherical lens. In some embodiments, the transmission optical system comprises more than one spherical lens. In some embodiments, the transmission optical system comprises a rod lens and a spherical lens. In some embodiments, the transmission optical system comprises a rod lens and more than one spherical lens. In some embodiments, the transmission optical system comprises more than one rod lenses and a spherical lens. In some embodiments, the transmission optical system comprises a spherical lens and an X cylinder lens. In some embodiments, the transmission optical system comprises more than one spherical lens and an X cylinder lens. In some embodiments, the transmission optical system comprises more than one spherical lens and more than one X cylinder lens. In some embodiments, the transmission optical system comprises a rod lens, more than one spherical lens, and an X cylinder lens. In some embodiments, the transmission optical system comprises more than one rod lens, more than one spherical lens, and a X cylinder lens. In some embodiments, the transmission optical system comprises a rod lens, more than one spherical lens, and more than one X cylinder lenses. In some embodiments, the transmission optical system comprises more than one rod lens, more than one spherical lens, and more than one X cylinder lens. In some embodiments, the transmission optical system comprises about 2, about 5, about 10, about 20 or more spherical lenses, including increments therein. In some embodiments, the transmission optical system comprises about 2, about 5, about 10, about 20 or more X cylinder lenses, including increments therein. In some embodiments, the transmission optical system comprises about 2, about 5, about 10, about 20 or more rod lenses, including increments therein.

In some embodiments, an apparatus is configured to translate an array of laser light sources in a transmission optical system along the Z axis to match the image size between transmission optical system and the collection optical system to focus the image. In some embodiments, an apparatus is configured to translate one or more spherical lenses in a transmission optical system along the Z axis to match the image size between the transmission optical system and the collection optical system to focus the image. In some embodiments, the apparatus comprises a ball bearing system, rack and pinion system, crossed roller system, leadscrew system, or any of the combination. In some embodiments, the apparatus comprises a servo, a screw drive, a pin slot mechanism, a translation stage, a linearized motor, or a combination thereof. In some embodiments, the apparatus comprises an active translational system which allows the array of laser light sources to be translated as needed during use. In some embodiments, the apparatus comprises a passive translational system to be adjusted and affixed during a manufacturing process. In some embodiments, the apparatus is adjusted manually by an end user. In some embodiments, the apparatus is adjusted automatically by an automated software controller, application, or component.

Referring to FIG. 1, in a particular embodiment, an array of laser light sources comprises an array of laser diodes (LD) 100 that emits light which is transmitted through a spherical lens 110 and another spherical lens 115 in transmission optical system 105 and onto an object 120 in the surrounding environment. The light reflected from the object 120 then passes through a spherical lens 130 and another spherical lens 135 and is focused onto photodetectors (PDs) 130 in collection optical system 125. An apparatus is configured to translate spherical lens 135 in the Z direction to focus an image of the object onto PDs 140.

Referring to FIG. 2, in a particular embodiment, an array of laser light sources comprises an array of laser diodes (LDs) 100 that emits light which is transmitted through a spherical lens 110 and another spherical lens 115 in transmission optical system 105 and onto an object 120 in the surrounding environment. The light reflected from the object 120 then passes through a spherical lens 130 and another spherical lens 135 and the image of the object is focused onto photodetectors 130 in collection optical system 125. An apparatus is configured to translate photodetectors (PDs) 140 in the Z direction to focus an image of the object onto PDs 140.

Figure 3A:
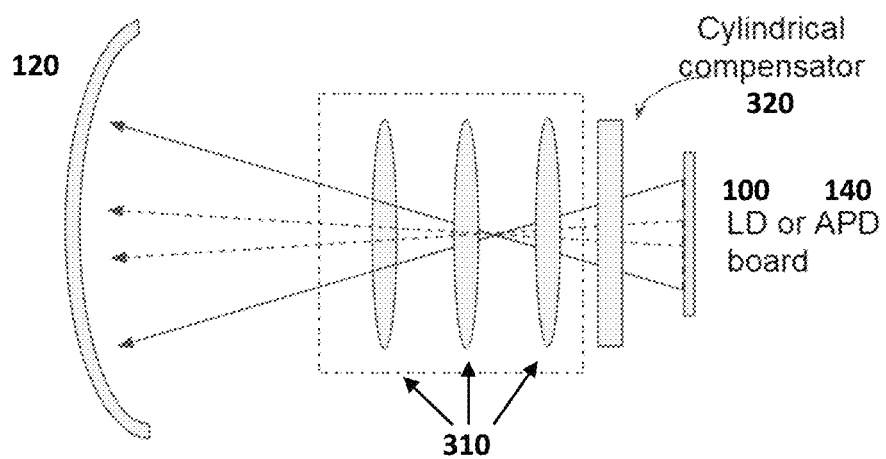
FIG. 3A shows a non-limiting schematic diagram of a transmission optical system; in this case, the transmission optical system comprises three spherical lenses and an X cylinder lens; and light travels from an array of laser diodes through the X cylinder lens and three spherical lenses to reach an object in the surroundings.

Referring to FIG. 3A, in a particular embodiment, an array of laser light sources comprises an array of laser diodes (LD) 100 that emits light which is transmitted through an X cylinder lens 320 which compensates the optical power introduced by a cylindrical pipe enclosure. The light is then collimated by a rod lens (not shown) in X direction and further collimated in a series of spherical lenses 310 in X and Y directions. The collimated light from the transmission optical system then illuminates an object 120 in the surrounding.

Figure 3B:
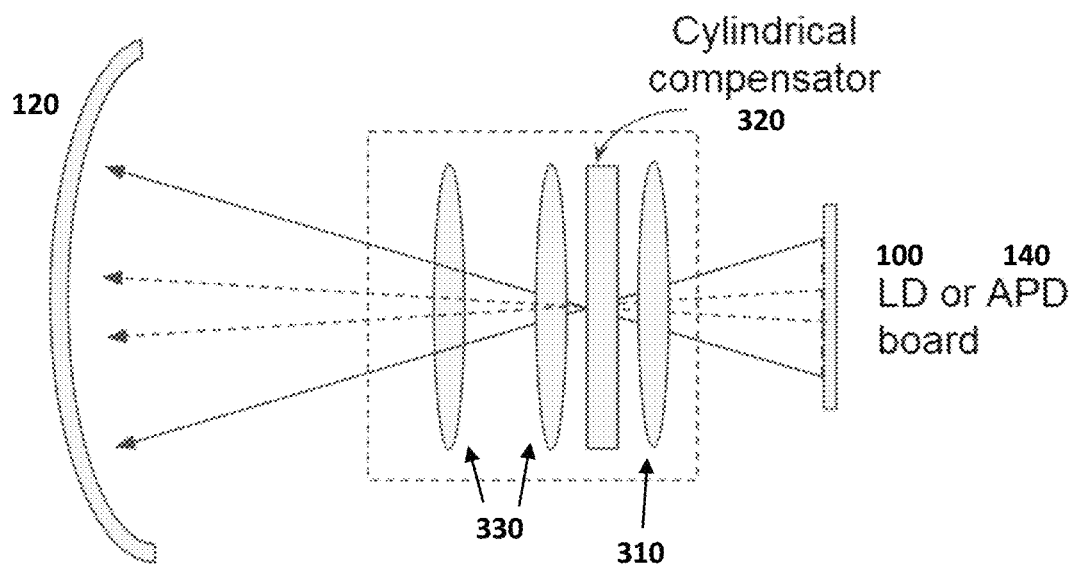
FIG. 3B shows a non-limiting schematic diagram of a transmission optical system; in this case, the transmission optical system comprises three spherical lenses and an X cylinder lens; and light travels from an array of laser diodes through first spherical lens and the X cylinder lens, then the two spherical lenses to reach an object in the surroundings.

Referring to FIG. 3B, in a particular embodiment, an array of laser light source comprises an array of laser diodes (LD) 100 that emits light which is transmitted through a rod lens (not shown) and is partially collimated in X direction. The partially collimated light is partially collimated in Y direction and further in X direction by a series of spherical lenses 310. The light then passes through a X cylinder lens 320 which compensates the optical power introduced by a cylindrical pipe enclosure. The light is further collimated by a series of spherical lenses 330 in X and Y directions. The collimated light from the transmission optical system then illuminates an object 120 in the surrounding.

Collection Optical System

In some embodiments, the platforms, systems, media, and methods described herein include a collection optical system, or use of the same. A collection optical system collects scattered or reflected light from an object in the surroundings wherein the light is originally emitted and collimated in a transmission optical system through a series of spherical lenses and illuminates the object. The collection optical system focuses the scattered or reflected light from the object through a X cylinder lens and a Y cylinder lens onto photodetectors, which convert the light to signal for processing like depth determination and image processing.

Many configurations are suitable for collection optical system. In some embodiments, the collection optical system comprises one spherical lens. In some embodiments, the collection optical system comprises more than one spherical lens. In some embodiments, the collection optical system comprises a rod lens and a spherical lens. In some embodiments, the collection optical system comprises a rod lens and more than one spherical lens. In some embodiments, the collection optical system comprises more than one rod lens and a spherical lens. In some embodiments, the collection optical system comprises a spherical lens and a X cylinder lens. In some embodiments, the collection optical system comprises more than one spherical lens and a X cylinder lens. In some embodiments, the collection optical system comprises more than one spherical lens and more than one X cylinder lens. In some embodiments, the collection optical system comprises a rod lens, more than spherical lens, and a X cylinder lens. In some embodiments, the collection optical system comprises more than one rod lens, more than one spherical lens, and a X cylinder lens. In some embodiments, the collection optical system comprises a rod lens, more than one spherical lens, and more than one X cylinder lenses. In some embodiments, the collection optical system comprises more than one rod lenses, more than one spherical lens, and more than one X cylinder lens. In some embodiments, the collection optical system comprises about 2, about 5, about 10, about 20 or more spherical lenses, including increments therein. In some embodiments, the collection optical system comprises about 2, about 5, about 10, about 20 or more X cylinder lenses, including increments therein. In some embodiments, the collection optical system comprises about 2, about 5, about 10, about 20 or more rod lenses, including increments therein.

In some embodiments, an apparatus is configured to translate an array of photodetectors in a collection optical system along the Z axis to match the image size between transmission optical system and the collection optical system to focus the image. In some embodiments, an apparatus is configured to translate one or more spherical lenses in a collection optical system along the Z axis to match the image size between transmission optical system and the collection optical system to focus the image. In some embodiments, the apparatus comprises a ball bearing system, rack and pinion system, crossed roller system, leadscrew system, or any combination thereof. In some embodiments, the apparatus comprises a servo, a screw drive, a pin slot mechanism, a translation stage, a linearized motor, or a combination thereof. In some embodiments, the apparatus comprises an active translational system which allows the array of laser light sources to be translated as needed in real-time during use. In some embodiments, the apparatus comprises a passive translational system to be adjusted and affixed during a manufacturing process. In some embodiments, the apparatus is adjusted manually by an end user. In some embodiments, the apparatus is adjusted automatically by an automated software controller, application, or component.

Referring to FIG. 1, in a particular embodiment, an array of laser light sources comprises an array of laser diodes (LD) 100 that emits light which is transmitted through a spherical lens 110 and another spherical lens 115 in transmission optical system 105 and onto an object 120 in the surrounding environment. The light reflected from the object 120 then passes through a spherical lens 130 and another spherical lens 135 and the image of the object is focused onto photodetectors (PDs) 130 in collection optical system 125. An apparatus is configured to translate spherical lens 135 in the Z direction to focus image of the object onto PDs 140.

Referring to FIG. 2, in a particular embodiment, an array of laser light sources comprises an array of laser diodes (LDs) 100 that emits light which is transmitted through a spherical lens 110 and another spherical lens 115 in transmission optical system 105 and onto an object 120 in the surrounding environment. The light reflected from the object 120 then passes through a spherical lens 130 and another spherical lens 135 and the image of the object is focused onto photodetectors 130 in collection optical system 125. An apparatus is configured to translate photodetectors (PDs) 140 in the Z direction to focus the image of the object onto PDs 140.

Array of Photodetectors

In some embodiments, the platforms, systems, media, and methods described herein include one or more arrays of photodetectors, or use of the same. An array of photodetectors receives light that is reflected or scattered by object in the surrounding environment and focused onto the array of photodetectors by a series of spherical lenses in a collection optical system. The light is originally emitted by laser diodes in a transmission optical system and transmitted through a series of spherical lenses in the transmission optical system before illuminating the object in the surrounding environment. The photodetectors convert light to signal for processing like depth determination and image processing.

In some embodiments, an apparatus is configured to translate an array of photodetectors in the Z direction to match the image size between the transmission optical system and the collection optical system to focus the image. In some embodiments, the apparatus comprises a ball bearing system, rack and pinion system, crossed roller system, leadscrew system, or any of the combination. In some embodiments, the apparatus comprises a servo, a screw drive, a pin slot mechanism, a translation stage, a linearized motor, or a combination thereof. In some embodiments, the apparatus comprises an active translational system which allows the array of laser light sources to be translated as needed in real-time during use. In some embodiments, the apparatus comprises a passive translational system to be adjusted and affixed during a manufacturing process. In some embodiments, the apparatus is adjusted manually by an end user. In some embodiments, the apparatus is adjusted automatically by an automated software controller, application, or component.

In some embodiments, each photodetector in an array of photodetector is paired with each laser light source to detect and input reflected light from an object.

In some embodiments, an array of photodetectors comprises about 2, about 5, about 10, about 20, about 50, about 75, about 100, or more photodetectors, including increments therein. In some embodiments, an array of photodetector comprises about 4, about 10, about 20, about 50, about 100, about 200, about 500, about 1000, about 2000, or more photodetectors, including increments therein. In some embodiments, an array of photodetectors comprises at least 2, at least 5, at least 10, at least 20, at least 50, at least 75, at least 100, or more photodetectors, including increments therein. In some embodiments, an array of photodetectors comprises at least 4, at least 10, at least 20, at least 50, at least 100, at least 200, at least 500, at least 1000, at least 2000, or more photodetectors, including increments therein.

In some embodiments, an array of photodetectors comprises photodetectors on a single, planar circuit board. In some embodiments, an array of photodetectors comprises photodetectors on a single, curved circuit board.

In some embodiments, an array of photodetectors comprises photodiodes. Non-limiting examples of photodiodes include PIN, avalanche, InGaAs, Si photodiodes. In some embodiments, an array of photodetectors comprises metal-semiconductor-metal photodetectors. In some embodiments, an array of photodetectors comprises phototransistors. In some embodiments, an array of photodetectors comprises photoresistors. In some embodiments, an array of photodetectors comprises phototubes. In some embodiments, an array of photodetectors comprises photomultipliers. In some embodiments, an array of photodetectors comprises pyroelectric photodetectors. In some embodiments, an array of photodetectors comprises thermal detectors. In some embodiments, an array of photodetectors comprises carbon nanotubes and graphene.

Referring to FIG. 1, in a particular embodiment, an array of laser light sources comprises an array of laser diodes (LD) 100 that emits light which is transmitted through a spherical lens 110 and another spherical lens 115 in transmission optical system 105 and onto an object 120 in the surrounding environment. The light reflected from the object 120 then passes through a spherical lens 130 and another spherical lens 135 and the image of the object is focused onto photodetectors (PDs) 130 in collection optical system 125. An apparatus is configured to translate spherical lens 135 in the Z direction to focus the image of the object onto PDs 140.

Referring to FIG. 2, in a particular embodiment, an array of laser light sources comprises an array of laser diodes (LDs) 100 that emits light which is transmitted through a spherical lens 110 and another spherical lens 115 in transmission optical system 105 and onto an object 120 in the surrounding environment. The light reflected from the object 120 then passes through a spherical lens 130 and another spherical lens 135 and the image of the object is focused onto photodetectors 130 in collection optical system 125. An apparatus is configured to translate photodetectors (PDs) 140 in the Z direction to focus the image of the object onto PDs 140.

Apparatus to Match Image Size

In some embodiments, the platforms, systems, media, and methods described herein include an apparatus to match image size, or use of the same. An apparatus to match image size is employed to match the image size of an object illuminated by light emitted and transmitted through a series of spherical lenses in a transmission optical system to that of the image received by one or more arrays of photodetectors through a series of spherical lenses in a collection optical system, resulting in a focused image of the object.

In some embodiments, a transmission optical system comprises a plurality of spherical lenses wherein at least some of the plurality of spherical lenses are configured to collimate light from the light sources in the X direction, collimate light from the light sources in the Y direction, and provide a field of view in the Y direction when the light is transmitted to an environment external to the LiDAR system. In further embodiments, the transmission optical system optionally further comprises an apparatus configured to translate one or more of the spherical lenses in the Z direction to change the focal length of the transmission optical system and match the image size between the transmission optical system and the collection optical system. In some embodiments, an apparatus is configured to translate one spherical lens in the transmission optical system along the Z axis to change the focal length of the transmission optical system and match the image size between transmission optical system and the collection optical system. In various embodiments, an apparatus is configured to translate 1, 2, 3, 4, 5, 6, 7, 8, 9, 10, or more, spherical lenses, including increments therein, in a transmission optical system along the Z axis. In some embodiments, an apparatus is configured to translate a series of spherical lenses in a transmission optical system along the Z axis to change the focal length of the transmission optical system and match the image size between the transmission optical system and the collection optical system.

The apparatus suitably translates the one or more of the spherical lenses of the transmission optical system by any distance necessary to match the image size between the transmission optical system and the collection optical system to focus the image. By way of example, in various embodiments, the apparatus translates the one or more of the spherical lenses by about 1, 2, 3, 4, 5, 6, 7, 8, 9, 10, or more, microns. By way of further example, in various embodiments, the apparatus translates the one or more of the spherical lenses by about 10, 20, 30, 40, 50, 60, 70, 80, 90, 100, or more, microns, including increments therein. By way of still further example, in various embodiments, the apparatus translates the one or more of the spherical lenses by about 100, 200, 300, 400, 500, 600, 700, 800, 900, 1000, or more, microns, including increments therein. By way of still further example, in various embodiments, the apparatus translates the one or more of the spherical lenses by about 1000, 2000, 3000, 4000, 5000, 6000, 7000, 8000, 9000, 10,000, or more, microns, including increments therein.

In some embodiments, a collection optical system comprises a plurality of spherical lenses wherein at least some of the plurality of spherical lenses are configured to focus the light from the light sources reflected from the environment external to the LiDAR system onto one or more arrays of photodetectors. In further embodiments, the collection optical system optionally further comprises an apparatus configured to translate one or more of the spherical lenses in the Z direction to change the focal length of the collection optical system and match the image size between the transmission optical system and the collection optical system. In some embodiments, an apparatus is configured to translate one spherical lens in the collection optical system along the Z axis to change the focal length of the collection optical system and match the image size between the transmission optical system and the collection optical system. In various embodiments, an apparatus is configured to translate 1, 2, 3, 4, 5, 6, 7, 8, 9, 10, or more, spherical lenses, including increments therein, in a collection optical system along the Z axis. In some embodiments, the apparatus is configured to translate a series of spherical lenses in the collection optical system along the Z axis to change the focal length of the collection optical system and match the image size between the transmission optical system and the collection optical system.

The apparatus suitably translates the one or more of the spherical lenses of the collection optical system by any distance necessary to match the image size between the transmission optical system and the collection optical system to focus the image. By way of example, in various embodiments, the apparatus translates the one or more of the spherical lenses by about 1, 2, 3, 4, 5, 6, 7, 8, 9, 10, or more, microns. By way of further example, in various embodiments, the apparatus translates the one or more of the spherical lenses by about 10, 20, 30, 40, 50, 60, 70, 80, 90, 100, or more, microns, including increments therein. By way of still further example, in various embodiments, the apparatus translates the one or more of the spherical lenses by about 100, 200, 300, 400, 500, 600, 700, 800, 900, 1000, or more, microns, including increments therein. By way of still further example, in various embodiments, the apparatus translates the one or more of the spherical lenses by about 1000, 2000, 3000, 4000, 5000, 6000, 7000, 8000, 9000, 10,000, or more, microns, including increments therein.

In some embodiments, an apparatus is configured to translate the one or more arrays of laser light sources in a transmission optical system along the Z axis to move the image plane of the transmission optical system and match the image size between the transmission optical system and the collection optical system. In various embodiments, the apparatus is configured to translate 1, 2, 3, 4, 5, 6, 7, 8, 9, 10, or more, arrays of laser light sources, including increments therein, in a transmission optical system along the Z axis to move the image plane of the transmission optical system and match the image size between the transmission optical system and the collection optical system. In a particular embodiment, the apparatus is configured to translate a 2D array of laser light sources (formed by stacking a plurality of linear arrays) in a transmission optical system along the Z axis to move the image plane of the transmission optical system and match the image size between the transmission optical system and the collection optical system. In some embodiments, the apparatus translates one or more linear arrays of laser light sources, and a rod lens associated with each of the linear arrays, in a transmission optical system along the Z axis to move the image plane of the transmission optical system and match the image size between the transmission optical system and the collection optical system.

The apparatus suitably translates the one or more arrays of laser light sources by any distance necessary to match the image size between the transmission optical system and the collection optical system. By way of example, in various embodiments, the apparatus translates the array of laser light sources by about 1, 2, 3, 4, 5, 6, 7, 8, 9, 10, or more, microns. By way of further example, in various embodiments, the apparatus translates the array of laser light sources by about 10, 20, 30, 40, 50, 60, 70, 80, 90, 100, or more, microns, including increments therein. By way of still further example, in various embodiments, the apparatus translates the array of laser light sources by about 100, 200, 300, 400, 500, 600, 700, 800, 900, 1000, or more, microns, including increments therein. By way of still further example, in various embodiments, the apparatus translates the array of laser light sources by about 1000, 2000, 3000, 4000, 5000, 6000, 7000, 8000, 9000, 10,000, or more, microns, including increments therein.

In some embodiments, an apparatus is configured to translate the one or more arrays of photodetectors in a collection optical system along the Z axis to move the image plane of the collection optical system and match the image size between the transmission optical system and the collection optical. In various embodiments, the apparatus is configured to translate 1, 2, 3, 4, 5, 6, 7, 8, 9, 10, or more, arrays of photodetectors, including increments therein, in a collection optical system along the Z axis to move the image plane of the collection optical system and match the image size between the transmission optical system and the collection optical system.

The apparatus suitably translates one or more arrays of photodetectors by any distance necessary to match the image size between the transmission optical system and the collection optical system to focus the image. By way of example, in various embodiments, the apparatus translates the array of photodetectors by about 1, 2, 3, 4, 5, 6, 7, 8, 9, 10, or more, microns. By way of further example, in various embodiments, the apparatus translates the array of photodetectors by about 10, 20, 30, 40, 50, 60, 70, 80, 90, 100, or more, microns, including increments therein. By way of still further example, in various embodiments, the apparatus translates the array of photodetectors by about 100, 200, 300, 400, 500, 600, 700, 800, 900, 1000, or more, microns, including increments therein. By way of still further example, in various embodiments, the apparatus translates the array of photodetectors by about 1000, 2000, 3000, 4000, 5000, 6000, 7000, 8000, 9000, 10,000, or more, microns, including increments therein.

Many translation mechanisms are suitable for translational of the one or more arrays of laser light sources, the one or more arrays of photodetectors, or the spherical lens(es) of the transmission or the collection optical systems. By way of examples, in some embodiments, the apparatus comprises a servo, a screw drive, a pin slot mechanism, a translation stage, a linearized motor, or any combination thereof. By way of further examples, in some embodiments, the apparatus comprises a ball bearing system, a rack and pinion system, a crossed roller system, a leadscrew system, or any combination thereof.

In some embodiments, the apparatus comprises an active translational system which allows the array of laser light sources, the array of photodetectors, or the spherical lens(es) of the transmission or the collection optical systems to be translated as needed in real-time during use. In some embodiments, the apparatus is actively adjusted automatically by an automated software controller, application, or component. In some embodiments, the apparatus is actively adjusted at manufacture, at testing, or periodically, substantially continuously, or continuously during operation.

In some embodiments, the apparatus comprises a passive translational system configured to be adjusted and affixed during manufacturing or testing process. In some embodiments, the apparatus is adjusted manually by a technician or an end user. In some embodiments, the apparatus is adjusted automatically by an automated software controller, application, or component.

Enclosure

In some embodiments, the platforms, systems, media, and methods described herein include an enclosure, or use of the same. In some embodiments, an enclosure encases a transmission optical system, a collection optical system, and an apparatus to match image size. An enclosure encases a transmission optical system, a collection optical system, and an apparatus to match image size. The enclosure has one or more windows through which collimated light emitted from the transmission optical system is allowed to pass through. The transmitted light illuminates object in the surroundings and is scattered or reflected by the object. The scattered or reflected light passes through a window in the enclosure and is focused onto an array of photodetectors by a series of lenses in the collection optical system. The array of photodetectors converts the light to signal for processing like depth determination or imaging processing.

In some embodiments, an enclosure comprises a hollow cylindrical pipe with a window at one end to allow the passage of light from a transmission optical system and to allow light into a collection optical system. In some embodiments, a X cylinder lens is employed in a transmission optical system to compensate the optical power introduced by a cylindrical pipe enclosure. In some embodiments, more than one X cylinder lens is employed in a transmission optical system to compensate the optical power introduced by a cylindrical pipe enclosure. In some embodiments, an enclosure comprises a first window to allow passage of light from the transmission optical system and a second window to allow passage of light to the collection optical system. In some embodiments, an enclosure comprises a hollow rectangular box with a window at one end to allow passage of light from a transmission optical system and to allow light into a collection optical system. In some embodiments, an enclosure comprises a hollow rectangular box with a first window to allow passage of light from the transmission optical system and a second window to allow passage of light to the collection optical system.

In some embodiments, an enclosure comprises an opaque material to prevent passage of light through the enclosure other than through one or more windows. In some embodiments, the window comprises a transparent material.

In some embodiments, the window is wedge-shaped to reduce interference fringes such as etalon fringe.

In some embodiments, an enclosure comprises a thermal stabilizing component to dissipate the heat generated from laser light sources and photodetectors.

Baffle

In some embodiments, the platforms, systems, media, and methods described herein include a baffle, or use of the same. A baffle reduces or blocks light from a transmission optical system or a collection optical system entering the other system. In some cases, it physically separates the transmission optical system and collection optical system such that the light from one system does not significantly bleed into the other system, reducing light contamination. A baffle also reduces unwanted light from the surroundings by absorbing or reflecting the unwanted light.

In various embodiments, the opaque material reduces transmission of light in visible, infrared, ultraviolet spectrum, or any combination thereof. In various embodiments, the opaque material blocks transmission of light in visible, infrared, ultraviolet spectrum, or any combination thereof. In some embodiments, the opaque material reduces transmission of light in electromagnetic spectrum. In some embodiments, the opaque material blocks transmission of light in electromagnetic spectrum. In some embodiments, a baffle comprises a transparent material with an opaque coating. In some embodiments, the opaque coating reduces transmission of light in visible, infrared, ultraviolet spectrum, or any combination thereof. In some embodiments, the opaque coating blocks transmission of light in visible, infrared, ultraviolet spectrum, or any combination thereof. In some embodiments, the opaque coating reduces transmission of light in electromagnetic spectrum. In some embodiments, the opaque coating blocks transmission of light in electromagnetic spectrum. In some embodiments, a baffle comprises an optical black coating to absorb stray light and unwanted light from the environment such as sunlight. In some embodiments, the optical black coating absorbs light in visible, infrared, ultraviolet spectrum, or any combination thereof. In some embodiments, a baffle comprises a reflective material.

In some embodiments, the baffle comprises a plurality of baffles wherein each of the baffle comprises a rear facing curved surface and a front facing curved surface that form a small tooth-like structure along the length of the baffle to reflect the unwanted light from the environment off of the focal plane.

EXAMPLES

The following illustrative examples are representative of embodiments of the subject matter described herein and are not meant to be limiting in any way.

Example 1

Goods Delivery

An autonomous vehicle operates as a delivery vehicle in San Francisco. It is configured to carry hot and cold meals as well as groceries around the city on customers' demand. Upon an order from a customer, the destination is automatically inputted into the autopilot of the vehicle. The vehicle is loaded with the requested items and the autopilot drives the vehicle toward the inputted destination. The autopilot functions by processing the 2D images and distance data taken from a LiDAR system. The LiDAR system is encased and attached to the top of the vehicle. The LiDAR system rotates at a high speed in azimuth direction as the vehicle moves, providing a 360 degree view of the vehicle's surroundings over the distance. The collected information is analyzed by the autopilot to make assessment of the speed, direction, and other factors in planning the path of the vehicle during the travel.

The LiDAR system determines the distance to surrounding objects by measuring the time for a light pulse to travel from the LiDAR system to being reflected or scattered by objects. The LiDAR system also generates 3D images by processing distance data with 2D images of object in the surroundings. As presented in FIG. 1 herein, distance to individual positions on object 120 is calculated by measuring the time of flight for a light to travel from a laser on LDs 100 in a transmission optical system 105 to reach the corresponding photodetector on PDs 140 in a collection optical system 125. LDs 100 consisting of an array of laser diodes emit light that passes through spherical lenses 110 and 115 to the object 120. The light is then reflected or scattered by object to be transmitted through spherical lenses 130 and 135 to reach an array of photodetectors 140. To match the image size between the transmission optical system and collection optical system, spherical lens 135 is translated on a ball bearing stage (not shown) to adjust focal length of the collection optical pathway. A focused image of the object is shined on photodetectors 140. LDs 100 and spherical lenses 110 and 115 are configured in such a way that the field of view in Y direction is 40 degrees. The enclosure comprising the transmission optical system and collection optical system rotates 360 degrees to provide a full field of view in the azimuth direction.

Example 2

Personal Transport

An autonomous vehicle operates as a personal vehicle in San Francisco. It is configured to carry passengers anywhere upon command. Once the destination is inputted into the autopilot of the vehicle by the user, the autopilot drives the vehicle toward the inputted destination. The autopilot functions by processing the 2D images and distance data taken from a LiDAR system. The LiDAR system is encased and attached to the top of the vehicle. The LiDAR system rotates at a high speed in the azimuth direction as the vehicle moves, providing a 360 degree view of the vehicle's surroundings over the distance. The collected information is analyzed by the autopilot to make assessment of the speed, direction, and other factors in planning the path of the vehicle during the travel.

The LiDAR system determines the distance to surrounding objects by measuring the time for a light pulse to travel from LiDAR system to being reflected or scattered by objects. The LiDAR system also generates 3D images by processing distance data with 2D images of object in the surroundings. As presented in FIG. 2 herein, distance to individual positions on object 120 is calculated by measuring the time of flight for a light to travel from a laser on LDs 100 in a transmission optical system 105 to reach the corresponding photodetector on PDs 140 in a collection optical system 125. LDs 100 consisting of an array of laser diodes emit light that passes through spherical lenses 110 and 115 to the object 120. The light is then reflected or scattered by object to be transmitted through spherical lenses 130 and 135 to reach an array of photodetectors 140. To match the image size between the transmission optical system and collection optical system, the array of photodetectors 140 is translated on a roller stage (not shown) to adjust focal length of the collection optical pathway. A focused image of the object is shined on photodetectors 140. LDs 100 and spherical lenses 110 and 115 are configured in such a way that the field of view in Y direction is 40 degrees. The enclosure comprising the transmission optical system and the collection optical system rotates 360 degrees to provide a full field of view in the azimuth direction.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. An optical system comprising:
   at least one array of laser light sources;
   a transmission optical system comprising a plurality of spherical lenses;
   a collection optical system comprising a plurality of spherical lenses; and
   at least one array of photodetectors comprising one photodetector paired with each laser light source in the at least one linear array of laser light sources, wherein one of the transmission optical system and the collection optical system are configured to translate to match an image size between the transmission optical system and the collection optical system.

2. The optical system of claim 1, wherein the apparatus configured to translate one selected from the group including the at least one array of laser light sources and the at least one array of photodetectors in the Z direction to move an image plane of the collection optical system comprises a translational system.

3. The optical system of claim 1, wherein the at least one array of laser light sources is linear.

4. The optical system of claim 3, wherein each linear array of laser light sources comprises a single, planar printed circuit board.

5. The optical system of claim 1, wherein the at least one linear array of laser light sources, the transmission optical system, the collection optical system, and the at least one array of photodetectors is configured to rotate.

6. The optical system of claim 5, wherein the at least one linear array of laser light sources, the transmission optical system, the collection optical system, and the at least one array of photodetectors is configured to rotate 360 degrees.

7. The optical system of claim 1, wherein each array of photodetectors comprises a single, planar printed circuit board.

8. An optical system comprising:
   an array of laser light sources including at least a first laser light source;
   an array of photodetectors including a first photodetector, wherein the first photodetector is paired with the first laser light source;
   a transmission optical system including a first plurality of spherical lenses, the first plurality of spherical lenses configured to at least partially collimate light emitted from the first laser light source, wherein the light emitted from the first laser light source passes through the first plurality of spherical lenses to an object, wherein the light emitted from the first laser light source reflects off of the object as reflected light; and
   a collection optical system including a second plurality of spherical lenses, wherein the reflected light is transmitted through the second plurality of spherical lenses to the array of photodetectors to create a focused image of the object, and wherein at least one spherical lens of the second plurality of spherical lenses is arranged to translate to match a size of the focused image between the transmission optical system and the collection optical system.

9. The optical system of claim 8 wherein the light emitted from the first laser light source is transmitted through a cylinder lens.

10. The optical system of claim 9 wherein the cylinder lens is configured to compensate optical power.

11. The optical system of claim 8 further including a cylindrical, wherein the light emitted from the first laser light source is arranged to be transmitted through the cylindrical lens.

12. The optical system of claim 11 wherein the light emitted from the first laser light source is arranged to be transmitted through the cylindrical lens before being collimated by the first plurality of spherical lenses.

13. The optical system of claim 11 wherein the light emitted from the first laser light source is arranged to be transmitted through at least a first spherical lens of the first plurality of spherical lenses before being transmitted through the cylindrical lens.

* * * * *